United States Patent [19]

Saxon

[11] 4,031,329
[45] June 21, 1977

[54] TIME LIMITED TELEPHONE PAGING EMPLOYS A RELAY SWITCH ACTUATED BY DUAL FREQUENCY TONE

[75] Inventor: B. Ronald Saxon, Harrisburg, Pa.

[73] Assignee: International Telephone and Telegraph Corporation, Nutley, N.J.

[22] Filed: Apr. 2, 1976

[21] Appl. No.: 673,233

Related U.S. Application Data

[63] Continuation of Ser. No. 479,005, June 13, 1974, abandoned.

[52] U.S. Cl. .......................................... 179/18 BF
[51] Int. Cl.² ...................................... H04M 11/02
[58] Field of Search ............................ 179/18 BF

[56] References Cited

UNITED STATES PATENTS

| | | | |
|---|---|---|---|
| 2,993,094 | 7/1961 | Danielsen | 179/84 VF |
| 3,076,059 | 1/1963 | Meacham et al. | 179/84 VF |
| 3,188,554 | 6/1965 | Reid | 333/81 |
| 3,530,250 | 9/1970 | Schaum et al. | 179/6 E |
| 3,538,256 | 11/1970 | Lucas | 179/90 K |
| 3,562,712 | 2/1971 | Thorne-Booth et al. | 340/171 R |
| 3,653,038 | 3/1972 | Webb et al. | 179/90 K |
| 3,655,915 | 4/1972 | Liberman et al. | 179/2 DP |
| 3,688,050 | 8/1972 | Goetchius et al. | 179/84 VF |
| 3,725,589 | 4/1973 | Golden | 179/2 A |
| 3,783,193 | 1/1974 | Lee | 179/2 A |
| 3,783,194 | 1/1974 | Vilips et al. | 179/2 DP |
| 3,824,484 | 7/1974 | Gillette | 179/84 VF |
| 3,829,616 | 8/1974 | Blough | 179/2 A |
| 3,829,783 | 8/1974 | Groenendaal et al. | 179/90 K |

FOREIGN PATENTS OR APPLICATIONS

| | | | |
|---|---|---|---|
| 45-7564 | 3/1970 | Japan | 331/49 |

OTHER PUBLICATIONS

IBM Technical Disclosure Bulletin, vol. 13, No. 9, Feb. 1971, pp. 2550–2551, "Switch Shaper," G. J. Laurer.
Radio Electronics, Nov. 1974, pp. 54 & 55 from "40 Projects Using Cosmos Digital IC's," R. M. Marston.
QST, July 1971, pp. 34–35.

*Primary Examiner*—George G. Stellar
*Attorney, Agent, or Firm*—John T. O'Halloran; Alfred C. Hill

[57] ABSTRACT

There is disclosed an arrangement to enable control of a function at a remote location from a local location employing two audio control signals (tones) each having a different frequency. A short burst of the two tones are injected into a telephone line at the local location. These two tones when detected simultaneously at the remote location provides an output signal from logic circuitry. This output signal triggers a timer whose output controls the function for a given period of time.

23 Claims, 1 Drawing Figure

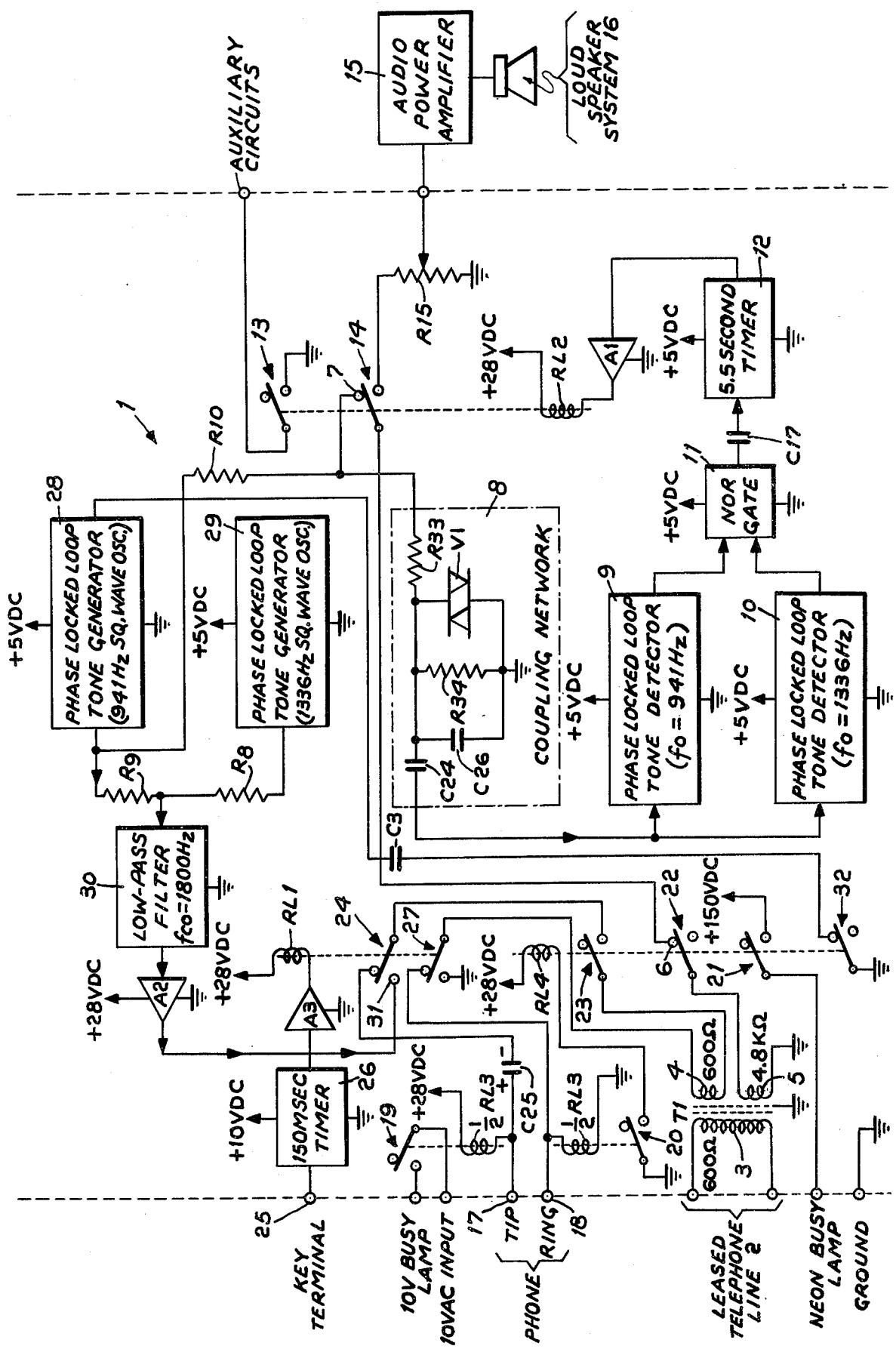

4,031,329

TIME LIMITED TELEPHONE PAGING EMPLOYS A RELAY SWITCH ACTUATED BY DUAL FREQUENCY TONE

CROSS-REFERENCE TO RELATED APPLICATIONS

This is a continuation of application Ser. No. 479,005, filed June 13, 1974 now abandoned.

BACKGROUND OF THE INVENTION

This invention relates to remote control arrangements and more particularly to an arrangement to control a function at a remote location from a local location.

Devices are presently employed to control a function at a remote location from a local location employing as the most convenient means of communication between the control location and the function location a transmission line, such as a leased telephone channel or line. Thus, the equipment employed acts as an interface between control and function and the leased telephone line. Audio band tone operation is generally employed because of the bandwidth characteristics of carrier and microwave long distance telephone channels. This is usually accomplished by employing audio frequency tone oscillators at one end of the system and narrow band tone filters at the opposite end of the system that are tunned to the same frequency as the oscillators. Also employed are switches gating the tone signals on and off of the leased telephone channel. The oscillators and filters are generally isolated and impedance matched via transformers. In systems where voice signals are present (remote paging and communication), there is the added requirement that the receiving tone filters be immune to the voice signal so as not to cause false operation or control of the remote function.

A disadvantage of these prior art arrangements is the lack of instantaneous operation. This is due to the requirement that a legitimate single frequency signal or tone must have a certain minimum time duration (approximately 0.8 seconds) in order to prevent false operation of the receiving tone filters by voice signals. Other disadvantages are the physical bulk and the high cost of these prior art devices which usually employ discrete circuit elements.

SUMMARY OF THE INVENTION

An object of the present invention is to provide a tone actuated remote control arrangement overcoming the above disadvatages of the prior art arrangements.

Another object of the present invention is to provide a tone actuated remote control system having substantially instantaneous operation.

Still another object of the present invention is to provide a tone actuated remote control system wherein the cost and physical size is reduced by employing state of the art linear and digital integrated circuit elements.

A feature of the present invention is the provision of an arrangement to control a function at a remote location from a local location comprising: a telephone line having a given operating frequency band interconnecting the local location to the remote location; a first source of a first audio control signal disposed at the local location, the first audio control signal having a first given frequency; a second source of a second audio control signal disposed at the local location, the second audio control signal having a second given frequency different than the first given frequency; first means coupled between the first and second sources and the telephone line at the local location to inject a short burst of the first and second audio control signals into the operating frequency band of the telephone line; second means coupled to the telephone line at the remote location to detect both the first and second audio control signals and provide an output signal only one both of the first and second audio conrol signals are detected simultaneously; and third means coupled to the second means responsive to the output signal to control the function at the remote location for a given period of time.

Another feature of the present invention is the provision of an audio control signal actuated telephone bridging unit comprising: a telephone line having a given operating frequency band; a first source of a first audio control signal having a first given frequency; a second source of a second audio control signal having a second given frequency different than the first given frequency; first means coupled between the telephone line and the first and second sources to inject a short burst of the first and second audio control signals into the operating frequency band of the telephone line to control a function at a remote location; second means coupled to the telephone line to detect both the first and second audio control signals transmitted from the remote location and provide an output signal only when both of the first and second audio control signals are detected simultaneously; and third means coupled to the second means responsive to the output signal to control a local function for a given period of time.

Still another feature of the present invention is the provision of an audio control signal generating unit coupled to a telephone system comprising: a telephone line having a given operating frequency band; a first source of a first audio control signal having a first given frequency; a second source of a second audio control signal having a second given frequency different than the first given frequency; and circuitry coupled between the telephone line and the first and second sources to inject a short burst of the first and second audio control signals into the operating frequency band of the telephone line.

A further feature of the present invention is the provision of an arrangement to control a function comprising: a telephone line having a given operating frequency band transmitting two audio control signals each having a different given frequency in the given operating frequency band; first means coupled to the telephone line to detect both of the two audio control signals and provide an output signal only when both of the two aduio control signals are detected simultaneously; and second means coupled to the first means responsive to the output signal to control the function for a given period of time.

BRIEF DESCRIPTION OF THE DRAWING

Above-mentioned and other features and objects of this invention will become more apparent by reference to the following description taken in conjunction with the accompanying drawing, in which the sole Figure is a block and schematic diagram of a tone actuated telephone bridging unit connected to one end of a leased telephone line in accordance with the principles of the present invention with the telephone bridging unit being duplicated at the other end of the leased telephone line.

DESCRIPTION OF THE PREFERRED EMBODIMENT

Referring to the Figure, an audio control signal or tone actuated telephone bridging unit 1 includes both transmitting and receiving circuitry and is disposed at one end of the leased telephone line 2 with this unit I being duplicated for the opposite end of telephone line 2 to enable a two-way control function or two-way communication via microwave and/or carrier telecommunication channels.

The receiver operation begins with the application of 941 Hz (hertz) plus a 1336 Hz audio control signals or tones to the leased telephone line 2 via transformer T1. Transformer T1 isolates telephone line 2 from the rest of the circuitry so as to preserve line balance as required by operating telephone companies. Primary winding 3 of transformer T1 presents a 600 ohm termination to telephone line 2. Transformer T1 also includes a 600 ohm secondary winding 4 to provide termination for the signal/voice (subset) circuits and a 4800 ohm secondary winding 5 for termination of the receiver circuits. The control tones transmitted from the remote end of line 2 pass through transformer T1 to winding 5 and then through the normally closed contacts 6 and 7 of relays RL4 and RL2, respectively, to the input of the receiver coupling network 8. Coupling network 8 is a passive circuit consisting of resistors R33 and R34, capacitors C24 and C26 and varistor V1. The function of network 8 is to provide proper signal attenuation, impedance matching, low pass filtering, D.C. (direct current) isolation and signal limiting. Resistors R33 and R34 form a voltage divider that optimizes the match between winding 5 of transformer T1 and the minimum input sensitivity requirements of the phase locked-loop tone detectors 9 and 10. In addition, resistors R33 and R34 optimize and level the impedance presented to winding 5 of transformer T1 over the operating frequency range. Capacitor C26 provides a low pass filter for higher order harmonics while adding its contribution to the overall impedance characteristic. Viristor V1 provides signal limiting to prevent false operation of detectors 9 and 10 while undergoing high amplitude inputs. Capacitor C24 provides D.C. isolation. After passing through network 8 the tones go to the parallel connected inputs of detectors 9 and 10 which are implemented by integrated circuits and circuitry external to these integrated circuits following standard practices. Basically, the external circuitry is designed for a ±3% bandwidth centered around the frequencies of 941 Hz and 1336 Hz. Thus, when the two tones of 941 Hz ±3% and 1336 Hz ±3% are simultaneously impressed upon the inputs of detectors 9 and 10, both detectors 9 and 10 will respond with a ground (OV DC) at their outputs. The outputs of detectors 9 and 10 are at +5V DC when inputs are either absent or outside the bandwidth of these detectors.

The output of each of detectors 9 and 10 is applied to one of the two inputs of a two input NOR logic gate 11. When both inputs are OV DC (logic "0"), the output of NOR gate 11 is +5V DC (logic "1"). In addition, if one or both phase locked loops do not operate because it lacks an input or the incoming tone is outside its bandwidth, than its (their) output will remain at +5V DC and the output of NOR gate 11 will remain at OV DC.

When the incoming tones cease, the outputs of detectors 9 and 10 return to +5V DC and the output of NOR gate 11 returns to OV DC from its +5V DC level. It is this negative going voltage shift or step that is used as a trigger for a 5.5 second integrated circuit timer 12.

The negative pulse from the output of NOR gate 11 is coupled to timer 12 via capacitor C17. The size of capacitor C17 is optimized to allow reliable triggering while providing a filtering effect to prevent false timer operation due to narrow duration noise and transient signals. Transient signals of this nature may be caused by the application of complex program sources (music, multiple voices, etc.) to the system input.

The output of timer 12 is coupled to DC amplifier A1. Amplifier A1, in turn, gates on relay RL2 for 5.5 seconds as determined by the circuitry of timer 12. When operated, one contact set 13 of relay QL2 provides ground to auxiliary circuits external to bridging unit 1, such as enable control for associated power amplifiers, etc. The remaining contact set 14 of relay RL2 removes winding 5 of transformer T1 via normally closed contact 6 of relay RL4 from the inputs of tone detectors 9 and 10 via coupling network 8 and transfers winding 5 to volume control potentiometer R15. The wiper of potentiometer R15 is connected to the input of an external audio power amplifier 15 which drives a loudspeaker system 16.

Thus, a short burst of tone, 150 msec. (milleseconds) consisting of a mixture of 941 Hz and 1336 Hz causes relay RL2 to be activated for 5.5 seconds. This allows a page message to be broadcast via power amplifier 15 and loudspeaker system 16 immediately following the end of the 150 msec. tone burst.

The transmitter portion of unit 1 will now be described. To initiate a call, the calling party takes the subset or phone offhook. This activates relay RL3 through tip terminal 17 and ring terminal 18. Relay RL3 has a dual field coil for the development of a conventional balanced line talk circuit via the phone tip terminal 17 and ring terminal 18. Actuation of relay RL3 provides a contact closure by contact set 19 for a low voltage, 10V AC, (alternating current voltage) busy lamp system. The contact set 20 of relay RL3 places ground on one end of relay RL4 thereby causing it to activate. One contact set 21 of relay RL4 provides contact closure for a high voltage (+150V DC) neon busy lamp system. A second contact set 22 of relay RL4 now opens the connection to detectors 9 and 10 via contact set 14 of relay RL2 and coupling network 8. A third contact set 23 of relay RL4 connects winding 4 of transformer T1 to phone relay RL3 through contact set 24 of relay RL1 and via DC blocking capacitor C25. The calling party's phone is now connected to leased telephone line 2 through isolation transformer T1.

The calling party now grounds key terminal 25 via external cabling and a momentary contact button (not shown). This ground creates a negative pulse which supplies a trigger to the 150 msec. timer circuit 26. This circuit provides a +10V DC level for 150 msec. after being triggered. This +10V DC level is coupled to DC amplifier A3 which in turn gates on relay RL1. Two contact sets 24 and 27 of relay RL1 disconnect phone relay RL3 and the phone circuit and connects the output of the transmitter to secondary winding 4 of transformer T1. The transmitter output is thereby impressed across the terminals of telephone line 2 for 150 msec. At the end of the 150 msec. period, relay RL1 is restored to its quiescent state and reconnects phone relay RL3 and the phone circuit to transformer T1. As described above, the end of the 150 msec. tone burst causes the remotely located receiver (detectors 9 and 10, NOR gate 11, timer 12 and amplifier A1) to operate relay RL2 for 5.5 seconds which connects secondary winding 5 of transformer T1 to the input of audio power amplifier 15. Since the 150 msec. interval is a very short time duration, the transmission of the tone burst and the subsequent operation of the relay RL2 at the remote end is, for all practical purposes, instantaneous. In fact, if the calling party commences paging at the time key terminal 25 is grounded, there is no noticeable clipping of the page message.

The transmitter signal is generated by two phase locked loop integrated circuit tone generators 28 and 29. The external circuits of the integrated circuit phase locked loops follow standard practice and are designed for frequencies of 941 Hz and 1336 Hz, respectively. Other types of square wave oscillators may be employed, however, the use of elements of the same type as used in detectors 9 and 10 give a temperature tracking effect. The output signals of generators 28 and 29 are combined via resistors R8 and R9. The purpose of resistors R8 and R9 is to mix the two frequencies and to attenuate these tones to the proper amplitude.

The combined signal is now fed into the input of low pass filter 30. Low pass filter 30 has a cut-off frequency $F_{co}$ of 1800 Hz, which allows it to effectively attenuate the harmonics of the 941 Hz and 1336 Hz square waves. The output signal of filter 30 is a combination of 941 Hz and 1336 Hz sine waves. The combined sine wave signal is now fed to the input of a unity gain buffer amplifier A2. The output of amplifier A2 is connected to normally open contact 31 of relay RL1. When relay RL1 is energized for 150 msec., as described above, the output signal of buffer amplifier A2 is fed to secondary winding 4 of transformer T1. The combined sine wave signal of 941 Hz and 1336 Hz appears across primary winding 3 of transformer T1 and is thereby impressed across telephone line 2. The values of resistors R8 and R9 are selected so as to produce a signal level of 0.7 vrms (volts root mean square) across the terminal of telephone line 2.

When relay RL4 is de-energized (subset on-hook), its contact set 32 connects capacitor C3 in the frequency determining circuit of generator 28. The addition of capacitor C3 in this circuit causes generator 28 to produce a tone having a frequency of 780 Hz. This 780 Hz square wave signal is attenuated by the voltage divider formed by series resistor R10 and the shunt impedance formed by the parallel combination of coupling network 8 and secondary winding 5 of transformer T1. Coupling network 8 provides a small amount of filtering for the 780 Hz square wave via capacitor C26. The value of resistor R10 is chosen so that a level of 15 millivolts appears at the terminal of telephone line 2 via contact sets 14 and 22 of relays RL2 and RL4, respectively, and transformer T1. This 15 millivolt, 780 Hz, square wave signal provides a constant low level signal over the telephone line 2 to give an indication that this particular telephone line is in use, even though there may be an absence of communication traffic. The signal is disconnected via contact set 22 of relay RL4 when the subset goes off-hook to either initiate or answer a call. The 780 Hz signal is also present at the input of detectors 9 and 10, but has no effect since its fundamental frequency and first harmonic are well outside the bandwidth of detectors 9 and 10. When relay RL2 is operated for the 5.5 second duration, the 780 Hz square wave signal is disconnected from secondary winding 5 of transformer T1 via contact set 14 of relay RL2. This prevents the 780 Hz signal from reaching the input of audio power amplifier 15 during paging. Then the subset or phone goes off-hook to initiate a call, relay RL4 is actuated which disconnects via contact set 32 capacitor C3 from generator 28.

When capacitor C3 is out of circuit, generator 28 will produce a frequency of 941 Hz instead of 780 Hz. As mentioned above, the 941 Hz and 1336 Hz signal are combined to form the tone burst which activates the remote receiver through detectors 9 and 10.

While I have described above the principles of my invention in connection with specific apparatus it is to be clearly understood that this description is made only by way of example and not as a limitation to the scope of my invention as set forth in the objects thereof and in the accompanying claims.

I claim:

1. An arrangement to control a loud speaker system at a remote location from a local location comprising:
    a telephone line having a given operating frequency band interconnecting said local location to said remote location;
    said loud speaker system being normally disconnected from said telephone line;
    a first source of a first audio control signal disposed at said local location, said first audio control signal having a first given frequency;
    a second source of a second audio control signal disposed at said local location, said second audio control signal having a second given frequency different than said first given frequency;
    first means coupled between said first and second sources and said telephone line at said local location to inject a short burst of said first and second audio control signals simultaneously into said operating frequency band of said telephone line;
    second means coupled to said telephone line at said remote location to detect both said first and second audio control signals and provide only a logic "1" output signal only when both of said first and second audio control signals are detected simultaneously; and
    third means coupled to said second means responsive to said output signal to actuate a relay and a contact thereof which connects said loud speaker system to said telephone line for a given period of time after cessation of said first and second audio control signals to enable said loud speaker system to broadcast a page message transmitted on said telephone line from said local location.

2. An arrangement according to claim 1, wherein each of said first and second sources includes
    a phase locked loop audio signal generator.

3. An arrangement according to claim 2, wherein said first means includes
    fourth means to combine said first and second audio control signals,
    a switching means coupled between said fourth means and said telephone line, and
    a first timer coupled to said switching means, said first timer being actuated by a calling party to actuate said switching means for a short period of time to inject said short burst of said first and second audio control signals simultaneously into said operating frequency band of said telephone line.

4. An arrangement according to claim 3, further including fifth means coupled to one of said first and second sources to produce an audio signal having a third given frequency different than said first and second given signals to be injected into said operating frequency band of said telephone line by said switching means to indicate said telephone line is in use even in the absence of communication traffic on said telephone line.

5. An arrangement according to claim 4, wherein said fourth means includes a low pass filter having a given cut-off frequency coupled between said first and second sources and said switching means to combine said first and second audio control signal for application to said switching means.

6. An arrangement according to claim 5, wherein said second means includes a first detector coupled to said telephone line to detect said first audio control signal, a second detector coupled to said telephone line to detect said second audio control signal, and logic circuitry coupled to said first and second detectors to provide said output signal only when both of said first and second audio control signals are detected simultaneously.

7. An arrangement according to claim 6, wherein said third means includes a second timer coupled to said logic circuitry responsive to said output signal to control said loud speaker system at said remote location for said given period of time.

8. An arrangement according to claim 7, wherein said second means further includes a coupling network coupled between said telephone line and said first and second detectors.

9. An arrangement according to claim 8, wherein said coupling network includes a series circuit having a first resistor and a first capacitor coupled between said telephone line and said first and second detectors, and a parallel circuit coupled between the junction of said first resistor and said first capacitor and ground, said parallel circuit having a second capacitor, a second resistor and a varistor.

10. An arrangement according to claim 6, wherein each of said first and second detectors includes a phase locked loop audio signal detector.

11. An arrangement according to claim 10, wherein said logic circuitry includes a NOR gate.

12. An arrangement according to claim 11, wherein said third means includes a second timer coupled to said NOR gate responsive to said output signal to control said loud speaker system at said remote location for said given period of time.

13. An arrangement according to claim 12, wherein said second means further includes a coupling network coupled between said telephone line and said first and second detectors.

14. An arrangement according to claim 13, wherein said coupling network includes a series circuit having a first resistor and a first capacitor coupled between said telephone line and said first and second detectors, and a parallel circuit coupled between the junction of said first resistor and said first capacitor and ground, said parallel circuit having a second capacitor, a second resistor and a varistor.

15. An arrangement according to claim 1, wherein said second means includes a first detector coupled to said telephone line to detect said first audio control signal, a second detector coupled to said telephone line to detect said second audio control signal, and logic circuitry coupled to said first and second detectors to provide said output signal only when both of said first and second audio control signals are detected simultaneously.

16. An arrangement according to claim 15, wherein said third means includes a timer coupled to said logic circuitry responsive to said output signal to actuate said relay for said given period of time.

17. An arrangement according to claim 16, wherein said second means further includes a coupling network coupled between said telephone line and said first and second detectors.

18. An arrangement according to claim 17, wherein said coupling network includes a series circuit having a first resistor and a first capacitor coupled between said telephone line and said first and second detectors, and a parallel circuit coupled between the junction of said first resistor and said first capacitor and ground, said parallel circuit having a second capacitor, a second resistor and a varistor.

19. An arrangement according to claim 15, wherein each of said first and second detectors includes a phase locked loop audio signal detector.

20. An arrangement according to claim 19, wherein said logic circuitry includes a NOR gate 21. An arrangement according to claim 20, wherein said third means includes a timer coupled to said NOR gate responsive to said output signal to actuate said relay for said given period of time.

22. An arrangement according to claim 21, wherein said second means further includes a coupling network coupled between said telephone line and said first and second detectors.

23. An arrangement according to claim 22, wherein said coupling network includes a series circuit having a first resistor and a first capacitor coupled between said telephone line and said first and second detectors, and a parallel circuit coupled between the junction of said first resistor and said first capacitor and ground, said parallel circuit having a second capacitor, a second resistor and a varistor.

* * * * *